United States Patent
Bakule

(10) Patent No.: US 7,166,667 B2
(45) Date of Patent: Jan. 23, 2007

(54) METHODS OF PREPARING PAINTS FROM PREPAINTS

(75) Inventor: Ronald David Bakule, Doylestown, PA (US)

(73) Assignee: Rohm and Haas Company, Philadelphia, PA (US)

( * ) Notice: Subject to any disclaimer, the term of this patent is extended or adjusted under 35 U.S.C. 154(b) by 414 days.

(21) Appl. No.: 10/439,947

(22) Filed: May 16, 2003

(65) Prior Publication Data

US 2003/0232913 A1 Dec. 18, 2003

Related U.S. Application Data

(60) Provisional application No. 60/388,089, filed on Jun. 12, 2002.

(51) Int. Cl.
*C08J 3/02* (2006.01)

(52) U.S. Cl. ............... 524/501; 524/497; 524/500; 524/906; 524/220; 523/172; 427/372.2

(58) Field of Classification Search ............ 523/172, 523/220; 524/497, 906, 501; 427/372.2
See application file for complete search history.

(56) References Cited

U.S. PATENT DOCUMENTS

| 4,069,186 A | 1/1978 | Ramig ............... 260/29.6 |
| 4,474,910 A | 10/1984 | Smith et al. ........... 523/220 |
| 6,316,544 B1 | 11/2001 | Sarkar ............... 524/832 |
| 6,720,380 B1 | 4/2004 | Hellmann et al. |
| 6,818,050 B1 * | 11/2004 | Nyssen ............... 106/401 |
| 2002/0016405 A1 | 2/2002 | Friel et al. ............ 524/501 |
| 2003/0110101 A1 | 6/2003 | Friel et al. ............ 705/28 |

FOREIGN PATENT DOCUMENTS

| EP | 1 125 643 A2 | 8/2001 |
| WO | WO 00/44834 | 8/2000 |
| WO | WO 00/60015 | 10/2000 |
| WO | WO 200063300 A1 * | 10/2000 |

OTHER PUBLICATIONS

Lambourne, R and Strivens, T A. Paint and Surface Coatings: Theory and Practice, 2$^{nd}$ Edition. Cambridge, Woodhead Publishing, 1999, p. 711.*
"Custom Colours", Industrial and Materials Technologies, Jul. 1998 (2 pages).
"Paint Manufacturing Process Optimization For The Building Industry Using Original Bases And Pigments Formulation", Craft Synthesis Report, Dec. 10, 1996; (11 pages).

* cited by examiner

*Primary Examiner*—Vasu Jagannathan
*Assistant Examiner*—Vickey Ronesi
(74) *Attorney, Agent, or Firm*—Andrew E. C. Merriam

(57) ABSTRACT

Sets of prepaints wherein at least one set member is in solid form, methods of formulating paint lines using the sets of prepaints, and a method of formulating a range of paints from the sets of prepaints, where the paint lines and ranges of paints are useful as road marking coatings, architectural coatings, industrial coatings, graphic art coatings, non-cementitious aggregate finish coatings, elastomeric coatings, adhesives, caulks, sealants, and other building related products, are disclosed.

8 Claims, No Drawings

METHODS OF PREPARING PAINTS FROM PREPAINTS

CROSS REFERENCE TO RELATED PATENT APPLICATIONS

This is a non-provisional application of prior pending U.S. provisional application Ser. No. 60/388,089 filed Jun. 12, 2002.

BACKGROUND OF THE INVENTION

This invention relates to sets of prepaints, methods of formulating paint lines using the sets of prepaints, and a method of formulating a range of paints from the sets of prepaints, where the paint lines and ranges of paints are useful as road marking coatings, architectural coatings, industrial coatings, graphic arts coatings, non-cementitious aggregate finish coatings, elastomeric coatings, adhesives, caulks, sealants, and other building related products.

BRIEF DESCRIPTION OF THE INVENTION

Formulating paints is a complex matter which involves the careful selection and mixing of various paint ingredients in different ratios, depending on the type of paint desired. The type and proportion of paint ingredients selected must provide a paint with specific processing and handling properties, as well as the desired final dry paint film properties. The major ingredients of latex paint formulations are typically a binder, an opacifying pigment, a pigment extender, and water. Common optional ingredients include defoamers, coalescents, plasticizers, thickeners, non-thickening rheology modifiers, driers, anti-skinning agents, surfactants, mildeweides, biocides and dispersants. Paint manufacturers therefore have to store a large number of paint ingredients, and change paint ingredients during manufacture, depending on the specific type of paint being prepared. Those involved in the supply chain, particularly paint retailers, have to carry large inventories of paints in order to offer a range of paints having various sheen levels, tint bases, particular end uses (i.e., exterior or interior), and various other qualities. This is especially true when using aqueous paints due to the high water content of such paints, as well as the large quantities of additives that are necessary for the prevention of attack by molds and bacteria, sedimentation or reagglomeration of the pigments, separation of the liquid phase, reduction in quality due to drying of the product in and on the containers, and other problem. This results in high costs with regards to the type and size of packaging materials, as well as the high cost ot storage and transportation.

It is therefore desirable to make paints using a limited number of paint ingredients to prepare all of the different paint formulations, and it is especially desirable that such paint ingredients be in a solid form, since dry powder paint compositions can be more easily stored and transported than their liquid counterparts. This would allow for the minimization of the number and type of paint ingredients required to make a range of paints, either at large-scale industrial plants or on a relatively smaller-scale, at point-of-sale or at point-of-use locations. It would also allow for the postponement of product differentiation in the paint industry, offering the buyer the flexibility of selecting the desired final product characteristics, including the color of the paint or the type of paint itself, while at the same time permitting the paint manufacturer or seller (retail or wholesale or distributor) to prevent stock outages, and minimize inventories of raw materials, intermediates and final products.

European Patent Number WO 00/60015 discloses a paint and coating system containing at least one solid component (a) including at least one pigment and at least one filler, and at least one binder component (b) in solid or liquid form, wherein the components of the system in water, with an energy input of less than 150 $J/cm^3$, produce an aqueous dispersion with a granularity of less than 60 µm. However, this reference does not disclose either the use of a limited number of paint ingredients to prepare a wide variety of paint formulations, or the use of opacifying pigments and extender pigments in separate prepaints.

U.S. patent application Ser. No. 2002/0016405 A1 discloses a set of prepaints sufficient to formulate at least one paint line, wherein the set includes at least one fluid opacifying prepaint, and at least one fluid binder prepaint; as well as a method of forming at least one paint line using the set of prepaints; and a method of forming a range of paints using the at least two paint lines formed from the set of prepaints. However, this reference does not disclose the use of prepaints in the form of a solid.

BRIEF SUMMARY OF THE INVENTION

Applicants have discovered that by using a set of different but mutually compatible prepaints, wherein at least one of the prepaints is in a solid form, one can significantly reduce the number and volume of paint ingredients needed to prepare a wide variety of paint formulations having varying finish characteristics.

DETAILED DESCRIPTION OF THE INVENTION

In a first aspect of the present invention there is provided a set of prepaints comprising: (i) at least one opacifying prepaint x, comprising at least one opacifying pigment; (ii) at least one extender prepaint y, comprising at least one extender pigment; and (iii) at least one binder prepaint z, comprising at least one polymer binder; wherein at least one of said prepaints (i), (ii), and (iii) is a solid; wherein said prepaints (i), (ii), and (iii) are different, mutually compatible, and water dispersible; and wherein said set of prepaints is sufficient to form at least one paint line.

In a second aspect of the present invention, there is provided a method of forming at least one paint line, comprising: (a) providing a set of mutually compatible, water dispersible prepaints, comprising: (i) at least one prepaint x, comprising at least one opacifying pigment; (ii) at least one prepaint y, comprising at least one extender pigment; and (iii) at least one prepaint z, comprising at least one polymer binder; wherein at least one of said prepaints (i), (ii), and (iii) is a solid; and (b) dispensing predetermined amounts of said prepaints into containers or application devices to form at least one paint line.

In a third aspect of the present invention, there is provided a method of forming a coating on a substrate, comprising the steps of: (a) providing a set of mutually compatible, water dispersible prepaints, comprising: (i) at least one prepaint x, comprising at least one opacifying pigment; (ii) at least one prepaint y, comprising at least one extender pigment; and (iii) at least one prepaint z, comprising at least one polymer binder; wherein said prepaints (i), (ii), and (iii) are solid; (b) dispensing predetermined amounts of said solid prepaints into containers or application devices to form at least one paint line; (c) dispersing said solid prepaints in an aqueous medium; (d) applying said dispersion to a substrate; and (e) drying said dispersion to form a coating.

In a fourth aspect of the present invention, there is provided a method of forming a range of paints comprising at least two paint lines, said method comprising the steps of: (a) providing a set of mutually compatible, water dispersible, prepaints sufficient to formulate at least two paint lines, comprising: (i) at least one prepaint x, comprising at least one opacifying pigment; (ii) at least one prepaint y, comprising at least one extender pigment; (iii) at least one prepaint z, comprising at least one polymer binder; and (iv) at least one additional opacifying, extender, or binder prepaint which is different from prepaints x, y, and z; wherein at least one of said prepaints (i), (ii), (iii) and (iv) is a solid; and (b) dispensing a predetermined amount of each of the prepaints into containers or application devices to form a range of paints.

The composition of the present invention relates to a set of different, mutually compatible, and water dispersible prepaints which is sufficient to formulate at least one paint line. The prepaints of the present invention include at least one opacifying prepaint x, which includes at least one opacifying pigment; at least one extender prepaint y, which includes at least one extender pigment; and at least one binder prepaint z, which includes at least one polymeric binder. At least one of the prepaints is in the form of a solid powder, and preferably all of the prepaints are in the form of a solid powder. The total number of prepaints is preferably in the range of 3 to 15.

The opacifying prepaint, x, of the composition of the invention includes at least one opacifying pigment. By "opacifying prepaint" is meant herein that the prepaint contains at least 50 percent by weight, on a solids basis, of at least one opacifying pigment. Opacifying pigments useful herein include white pigments which impart hiding or white light scattering power to the paint across all visible wavelengths without a high degree of absorption. Suitable opacifying pigments include titanium dioxide ($TiO_2$) and a combination of titanium dioxide and auxiliary hiding pigments such as voided latex latex particles, zinc oxide, lead oxide, a synthetic polymer pigment, and mixtures thereof. Rutile and anatase grades of titanium dioxide are suitable for use herein. Rutile titanium dioxide is preferred. The surface of the titanium dioxides may be treated with various organic and/or inorganic surface treatments, such as the oxides of silica, alumina, and zirconia. Fumed titanium oxide is also useful herein.

The voided latex particles useful herein as auxiliary hiding pigments have a particle size diameter of from about 100 nm to about 2,500 nm, preferably from about 500 nm to about 1,100 nm and a void fraction of from about 10% to about 75%. The voided latex particles have at least one void, and preferably, the voided latex particles have a single void. The voids may be interconnected, have channels connected to the outside of the particles, have vesiculated or spongelike structures, or have a non-spherical shape. The voided latex particles have a glass transition temperature (Tg), of at least about 20° C., preferably at least about 50° C., as calculated using the Fox equation (1) (T. G. Fox, Bull. Am. Physics Soc., Volume 1, Issue No. 3, page 123 (1956)). That is, for calculating the Tg of a copolymer of monomers M1 and M2, $$1/Tg(calc.)=w(M1)/Tg(M1)+w(M2)/Tg(M2) \qquad (1)$$

wherein

Tg(calc.) is the glass transition temperature calculated for the copolymer;

w(M1) is the weight fraction of monomer M1 in the copolymer;

w(M2) is the weight fraction of monomer M2 in the copolymer;

Tg(M1) is the glass transition temperature of the homopolymer of M1; and

Tg(M2) is the glass transition temperature of the homopolymer of M2, with all temperatures being measured in ° K.

The higher the glass transition temperature, the harder the particle is and the less likely it is to collapse. If the voided latex particles collapse, they are unable to contribute to hiding. The voided latex particles are prepared by conventional polymerization processes known in the art, such as those disclosed in U.S. Pat. No. 3,784,391, U.S. Pat. No. 4,798,691, U.S. Pat. No. 4,908,271, U.S. Pat. No. 4,972,000, U.S. Pat. No. 5,041,464, U.S. Pat. No. 5,157,084, U.S. Pat. No. 5,216,044 and U.S. Pat. No. 6,020,435, as well as Japanese Patent Applications 60/223,873, 61/62510, 61/66710, 61/86941, 62/127336, 62/156387, 01/185311, and 02/140272. Preferably, the voided latex particles are prepared according to U.S. Pat. No. 4,427,836, U.S. Pat. No. 4,469,825, U.S. Pat. No. 4,594,363, U.S. Pat. No. 4,880,842, U.S. Pat. No. 5,494,971 and U.S. Pat. No. 6,020,435.

In one embodiment, the opacifying prepaint is a titanium dioxide prepaint which includes at least one titanium dioxide opacifying pigment, at least one dispersant, and at least one thickener. Where the opacifying prepaint is in the form of a liquid, it further includes water; has a volume solids content of from about 30% to about 80%, preferably from about 40% to about 65%; has a Stormer viscosity of from about 50 to about 250 KU, preferably from about 60 to about 150 KU; and preferably is stable to sedimentation (i.e., the pigment does not settle out after 10 days at 25° C.).

In another embodiment, the opacifying prepaint is a titanium dioxide prepaint useful for formulating a one pack, pigmented latex paint containing other paint ingredients. The prepaint includes at least one opacifying pigment, at least one dispersant, at least one thickener, and at least one film-forming or nonfilm-forming polymeric binder. Where the opacifying prepaint is used in the form of a liquid, it further includes water; has a volume solids content of from about 30% to about 80%, preferably from about 40% to about 65%; has a PVC of from about 35% to 100%, preferably from about 45% to 100%; has a Stormer viscosity of from about 50 to about 250 KU, preferably from about 60 to about 150 KU; and preferably is stable to sedimentation (i.e., it does not settle out after 10 days at 25° C.). Optionally, the polymeric binder is adsorbed onto the titanium dioxide opacifying pigment or other opacifier if present.

The extender prepaint, y, of the composition of the invention, includes at least one extender pigment. By "extender prepaint" is meant herein that the prepaint contains at least 50 percent by weight, on a solids basis, of at least one extender pigment. Extender pigments are inorganic solids or opaque polymers which do not impart the primary color or hiding power to the paint although they may have secondary influences on those properties. They provide volume, are low cost, are insoluble in water, and have a low absorption number. Extender pigments useful herein include exterior and interior extender pigments optimized for the intended end use. Exterior extender pigments are insoluble in water and have a low absorption number. They are optimized for exterior durability in the particular market where the paint is sold, and do not detract from the desired non-cracking, non-chalking, and non-dirt-retaining properties of the dried paint. They also provide low cost volume. Interior extender pigments are optimized for hiding, gloss, and low cost. Suitable extender pigments include barium sulfate (having a particle size of from about 1 micron to about 15 microns), Blanc Fixe (having a particle size of from about 0.5 microns to about 5 microns), calcium carbonate (having a particle size of from about 0.05 microns to about 35 microns), silica (having a particle size of from about 0.001 microns to about 14 microns), magnesium silicate (having a particle size of from about 0.5 microns to about 15 microns), aluminum silicate (having a particle size of from about 0.2 microns to about 5 microns), mica, bentonite, magnesium alumino-silicate, fumed allumina, colloidal attapulgite, synthetic amorphous sodium alumino-silicate, and sodium potassium alumino-silicate, and the like.

In one embodiment, the extender prepaint includes at least one mineral extender, and at least one thickener. A polymeric binder is also optionally included. Where the extender prepaint is in the form of a liquid, it further includes water; has a volume solids content of from about 30% to about 80%, preferably from about 40% to about 70%; has a PVC of from about 35% to 100%, preferably from about 40% to 100%; and has a Stormer viscosity of from about 50 to about 250 KU, preferably from about 60 to about 150 KU.

The binder prepaint, z, of the composition of the invention, includes at least one polymer binder. By "binder prepaint" is meant herein that the prepaint contains at least 50 percent by weight, on a solids basis, of at least one polymer binder. Polymer binders are polymers or prepolymers which form the primary film of the paint. Binders hold the pigment and/or extenders together when in dry film form, provide the required paint flow, and determine the gloss and hardness of the final paint film. The binders selected for the prepaints will depend upon the intended use of the formulated paints. For example, binders suitable for exterior paints are generally suitable for interior paints, but binders suitable for interior paints may not be suitable for exterior paints.

Suitable polymer binders include, but are not limited to, homopolymers, copolymers and terpolymers having compositions such as, for example, acrylic and/or methacrylic, polyvinyl acetate, styrene-acrylic, styrene-butadiene, vinyl acetate-acrylic, ethylene-vinyl acetate, vinyl acetate-vinyl versatate, vinyl acetate-vinyl maleate, vinyl acetate-vinyl chloride-acrylic, ethylene-vinyl acetate-acrylic, and urethane polymers, optionally containing up to 10% by weight of functional and other monomers, and mixtures thereof. Polymer binders optionally incorporated in prepaints x, y, or other prepaints are the same as or different from the polymer binder of prepaint z.

In one embodiment, the binder prepaint includes a waterborne latex polymer binder having a Tg, as calculated using the Fox equation, of from about −30° C. to about 70° C., preferably from about −10° C. to about 60° C. Where the binder prepaint is in the form of a liquid, it further includes water; has a volume solids content of from about 25% to about 70%, preferably from about 30% to about 65%; and has a Brookfield viscosity of less than about 100,000 centipoise, preferably from about 100 to about 50,000 centipoise, at a shear rate of 1.25 reciprocal seconds. Where the binder prepaint is in the form of a solid, and includes a polymeric binder having a Tg below ambient temperature, that is, if the polymer binder particles are soft, then in one embodiment, the soft polymer is modified to prevent fusion of the polymer particles. Such modification is accomplished, for example, by coagulating a latex of a hard polymer on the soft polymer particles, or by coating the soft polymer with a pigment or extender or other material which is hard enough to provide a buffer between the polymer particles without hindering film formation. In another embodiment, agglomeration of the soft polymer is prevented by spray drying the soft polymer with an inert particulate material such as silica, aluminum silicates, calcium carbonate, and combinations thereof.

As noted above, at least one of the prepaints is in the form of a solid. In one embodiment, the solid opacifying prepaint and the solid extender prepaint are obtained by wet grinding the prepaint ingredients in an aqueous medium and then drying them. By "wet grinding" is meant herein homogenization by dispersion. Processes that can be used to achieve wet grinding are well known in the art, such as for example dissolvers, attrition mills, ball mills, rotor-stator mills, stirred bead mills, and high pressure homogenizers. The binder prepaint is obtained by preparing the binder by a conventional process such as emulsion, suspension, and precipitation polymerization; adding the other prepaint ingredients; and drying. Processes suitable for drying the prepaints are also well known in the art, such as for example, spray drying (for example by means of a high pressure or spiral chamber nozzle, atomizing discs), freeze drying, spray freeze drying, fluidized bed drying, build-up granulation (for example by the disc or drum granulation method), fluidized bed drying, and mixing agglomeration.

Where at least one liquid prepaint is used, the ingredients of the liquid prepaint are compatible with each other. The liquid prepaint is mutually compatible with other prepaints with which it is used. Where all of the prepaints are in the form of a solid, the ingredients of each prepaint are mutually compatible with the ingredients of the other prepaints, when dispersed in an aqueous medium. As used herein, "mutually compatible" means that the paints formed by admixing the prepaints do not evidence signs of colloidal instability such as flocculation. Preferably the paints formed from the prepaints exhibit less than 5 g of residue such as gel and grit per liter of paint when the paint is passed through a 325 mesh screen, more preferably the paints formed from the prepaints exhibit less than 1 g of residue per liter of paint when the paint is passed through a 325 mesh screen. Preferably the prepaints, where used in the form of a liquid, exhibit less than 5 g of residue such as gel and grit per liter of prepaint when the prepaint is passed through a 325 mesh screen, more preferably the prepaints exhibit less than 1 g of residue per liter of prepaint when the prepaint is passed through a 325 mesh screen. If the prepaints, colorants, and optional additives included to enhance specific paint properties are fully compatible, then they are blendable in any combination falling within the formulation space needed to achieve the desired property profile in the final paint. By "fully compatible" is meant herein that the ingredients are blendable at any ratio without inducing colloidal instability. It is sufficient, however, for the prepaints, colorants, and optional additives included to enhance specific paint properties to be compatible. By "compatible", is meant herein that they are blendable at desired ratios without inducing colloidal instability to achieve the desired property profile in a range of paints.

Where a single paint line is desired, then the complete paint line is made from one each of prepaint x, prepaint y and prepaint z. As used herein, "paint" is a term which is used in its broadest sense, which is intended to include any coating that may be applied to a surface for decorative and/or protective purposes, such as, for example those paints employed for road marking coatings, architectural coatings, industrial coatings, graphic art coatings, non-cementitious aggregate finish coatings, elastomeric coatings, adhesives, and caulks. As used herein, a "paint line" includes at least two different paints which exhibit dried film properties that differ materially from each other in at least one observable property such as sheen, color and outdoor durability. A paint line could include, for example, a group of paints selected from three paints which, upon drying, form films having different sheen levels; two paints that, upon drying, form films which are suitable for indoor or outdoor performance; and four paints which, upon drying, form films having different quality or performance levels, such as for example, different levels of scrub resistance. More particularly, a paint line could include four different paints, the dried films of which have different sheen levels, typically marketed as gloss, semi-gloss, eggshell, satin or low lustre, and flat. The sheen is determined by the volume and type of binder(s), pigment(s), and extender(s), if any, in the paint.

In addition to the various sheen levels, paints are commonly formulated to be untinted (white) or tinted to a wide variety of colors using different tint bases, including pastel or light tones, medium or mid-tones, and deep tones. This capability requires a paint line having four paints. Also, paints are formulated to provide certain levels of performance properties, such as may be marketed as good/standard, better and best/premium.

As noted above, a "paint line" includes two or more different paints whose dried films differ materially in at least one observable property. By "different" is meant herein that the paints meet one of the following criteria:
(1) the pigment volume concentration (PVC) of the paints that are most different must differ by at least 2%; or
(2) the volume solids (VS) of the paints that are most different must differ by at least 2%.

The pigment volume concentration (PVC) is a measure of how "binder-rich" a formulation is. It is calculated using the following formula (2):

$$PVC(\%) = \frac{\text{volume of pigment(s)} + \text{volume extender(s)} \times 100}{\text{volume of pigment(s)} + \text{volume extender(s)} + \text{volume binder(s)}} \quad (2)$$

The volume solids content (VS) is the dry volume of pigment(s) plus dry volume of extender(s) plus dry volume of binder(s). It is calculated using by the following formula (3):

$$VS(\%) = \frac{\text{dry volume of pigment(s)} + \text{dry volume of extender(s)} + \text{dry volume of binder(s)} \times 100}{\text{total volume of formulation}} \quad (3)$$

When additives are present, their volume is not included in determining the total dry volume.

One embodiment of the present invention relates to a method of preparing at least one paint line by providing the composition of the invention, as defined above, and dispensing predetermined amounts of the prepaints into containers or application devices. By selling the prepaints in the form of a solid, the seller can minimize the volume of raw materials that must be stored to make the paint line, and hence minimize storage and transportation costs. In a different embodiment, where all of the prepaints are in a solid form, the prepaints are dispersed, in predetermined amounts, in an aqueous medium to form a liquid paint prior to sale to the purchaser who can then apply the paint to a substrate, and then allow it to dry to form a coating. In another embodiment, where at least one of the prepaints is not in the form of a solid, the solid prepaint(s) are dispersed in the liquid prepaint(s), are then be diluted as necessary prior to application to a substrate and drying.

Another embodiment of the present invention relates to a method of preparing a range of paints, which includes at least two paint lines, by providing a set of different, mutually compatible, and water dispersible prepaints that is sufficient to formulate at least one paint line, where the prepaints include at least one prepaint, x, containing at least one opacifying pigment; at least one prepaint, y, containing at least one extender pigment; at least one prepaint, z, containing at least one polymeric binder, and at least one additional opacifying prepaint, extender prepaint, or binder prepaint which is different from prepaints x, y, and z . . . At least one of the prepaints is in the form of a solid powder, preferably all of the prepaints are in the form of a solid powder. A predetermined amount of the prepaints is dispensed into containers or application devices to form a range of paints. By selling the prepaints in the form of a solid, the seller can minimize the volume of raw materials must be stored to make the range of paints, and hence minimize storage and transportation costs. Alternatively, where all of the prepaints are in a solid form, the prepaints are dispersed, in predetermined amounts, in an aqueous medium to form a liquid paint, prior to sale to the purchaser who can then apply the paint to a substrate, and then allow it to dry to form a coating. Where at least one of the prepaints is not in the form of a solid, the solid prepaint(s) are dispersed in the liquid prepaint(s), which are be diluted as necessary prior to application to a substrate and drying.

As used herein, the term "a range including at least two paint lines", is defined by analogy to an x-y graph, where the horizontal axis of the graph is the x axis, and the vertical axis of the graph is the y axis. The x axis represents a single paint line where each point on the axis represents a paint which differs materially from other paints in the line in at least one observable property, such as sheen and/or tone. The y axis, represents another paint line where each point on the axis represents a different paint which differs materially from other paints in the line in at least one observable property, such as use area (indoor or outdoor), and/or quality level (e.g. good/standard, better, and best/premium). Any point on the x-y graph is represented by an ordered pair, "(x,y)", where x is the x-coordinate, and y is the y-coordinate. "A range including at least two paint lines" is represented by each and every possible combination of ordered pairs within the graph. Also encompassed, however, is a range of paints in which certain of the ordered pairs, up to 30% of the total number of ordered pairs, are selected to be omitted, for example, for commercial reasons. Further contemplated is a range of paints in which the observable properties of the dried paint films closely and substantially fulfill the definition herein; for example, the sheen of a dried outdoor mid-tone gloss paint in the standard, better, and premium lines may differ by a few points on the scale of measure of sheen, without departing from the meaning of a range of paints of this invention.

If a range of paints including two paint lines is desired, i.e., if two key properties are varied (for example, two selected from sheen level, tint base, use type, and quality type), then the range of paints may be made from at least one each of prepaint x, prepaint y, and prepaint z and at least one additional prepaint x', y', or z', depending on which key properties are varied. By "additional prepaint x', y', or z'" is meant herein a prepaint different from prepaint x, y, or z, respectively, but otherwise having the charactersitics associated with prepaint x, y, or z.

If a range of paints including three paint lines is desired, i.e., if three key properties are varied (for example, three selected from sheen level, tint base, use type, and quality type) then the range of paints is made from at least one each of prepaint x, prepaint y and prepaint z and at least two additional prepaints x', y', or z', depending on which key properties are varied.

If a range of paints including four paint lines is desired, i.e., if four key properties are varied (for example, sheen level, tint base, use type, and quality type), then the complete range of paints is made from at least one each of prepaint x, prepaint y and prepaint z and at least three additional prepaints x', y', or z', depending on which key properties are varied.

This technique is capable of being extended to vary as many additional key properties as desired.

In each of the above embodiments, the prepaints are selected so that they provide a wide formulation space so that the desired final paint properties lie within the blend space defined when the prepaints are at the extremes. In many cases, the prepaints are not by themselves practical paints; however, by pushing the prepaints to these extremes one can maximize the blend space available for the paint line. When the prepaints, additives, and colorants are all fully compatible, they can be blended at the desired ratios to achieve the desired paint line(s) and range of paints without inducing colloidal instability. This technique is similar to the design principles used in statistical experimental design and analysis of mixture component designs; however, instead of designing a mixture space to explore the response surface within it, the boundaries of the mixture space are designed to maximize the flexibility of the paint system.

Paint properties are predicted in a number of ways. One approach involves the development of response surface models of the blend space using standard mixture component experimental design statistical tools. These simple statistical models are then used by a linear optimization program, a massive grid search, or a graphical analysis tool. Another approach is to use empirical methods to determine which blends are needed for specific paint lines, then incorporate those empirical recipes in paint making machine software.

An extension of these techniques is to have the paint machine automatically pretest certain key properties (e.g., viscosity, drying speed, opacity or color) and make minor adjustments during the formulating of the paint from the prepaints. Having feedback loops in the paint machine provides more precise matching of viscosity, drying speed, opacity, and color targets.

According to certain alternative embodiments of the invention, minor amounts, i.e. less than about 10% by weight, based on the total weight of the prepaint, of conventional paint additives are added to the above prepaints. Such additives include, for example, acid, base, defoamer, coalescent, cosolvent, mildewcide, biocide, antifreeze agent, thickener, dispersant, alkali soluble resin, aggregate, rust inhibitor, crosslinking agent, wax and the like. These additives must be compatible with the each other, and with the other ingredients in the prepaint.

Thickener is a general term which includes any material added to a paint to modify its rheological profile. Preferred thickeners for use herein are associative thickeners, meaning water soluble or water swellable polymers that have chemically attached hydrophobic groups which are capable of non-specific hyrdrophobic associations. Suitable thickeners for use herein include polyvinyl alcohol (PVA), hydrophobically-modified, alkali soluble emulsions known in the art as HASE emulsions, alkali-soluble or alkali-soluble emulsions known in the art as ASE emulsions, hydrophobically-modified ethylene oxide-urethane polymers known in the art as HEUR thickeners, and cellulosic thickeners such as hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, 2-hydoxypropyl cellulose, and the like. Also useful as thickeners are fumed silica, attapulgite clay and other types of clay, titanate chelating agents, and the like.

Suitable dispersants for use herein include non-ionic, anionic, and cationic dispersants such as 2-amino 2-methyl 1-propanol (AMP), dimethyl amino ethanol (DMAE), potassium tripolyphosphate (KTPP), trisodium polyphosphate (TSPP), citric acid and other carboxylic acids, and the like. Anionic polymers such as homopolymers and copolymers based on polycarboxylic acids, including those that have been hydrophobically- or hydrophilically-modified, e.g., polyacrylic acid or polymethacrylic acid or maleic anhydride with various monomers such as styrene, acrylate or methacrylate esters, diisobutylene, and other hydrophilic or hydrophobic comonomers. Also, included are salts of the aforementioned polymers, as well as mixtures of these dispersants.

Alkali-soluble resins are polymers that contain sufficient acid functionality and low enough molecular weights to dissolve in an aqueous media when neutralized with base. They exhibit Newtonian rheology, and act as a dispersant (i.e. reduce the surface tension of the aqueous medium). Suitable alkali-soluble resins include esters of acrylic acid and methacrylic acid copolymerized with carboxylic acid monomers (such copolymers, for example, are available from Rohm and Haas Company, Philadelphia, Pa., and are sold under the trade names Acrysol™ I-62 and Acrysol™ I-2074), copolymers of styrene and acrylic acid with optional alpha-methyl styrene (such polymers, for example, are available from Rohm and Haas Company and are sold under the trade name Morez™ 101), styrene/maleic anhydride copolymers, and the like.

Suitable defoamers include silicone-based and mineral oil-based defoamers, and the like.

Coalescents are not necessary if solvent-free latex polymeric binders are used in the binder prepaints. By "coalescent" is meant herein an organic solvent used in coatings that aids in film formation by acting as a temporary plasticizer, thereby helping the binder to form a continuous film when applied to a substrate. Solvent-free binders typically have a low Tg and low minimum film-forming temperature so that they are film-forming at ambient temperatures, such as about 20° C. If a coalescent is required, preferably it is incorporated in each of binder prepaint (iii) and any other prepaints containing latex polymeric binders. Suitable coalescents, plasticizers, and other optional solvents include ethylene glycol, propylene glycol, hexylene glycol, 2,2,4-trimethyl-1,3-pentanediol monoisobutyrate (TEXANOL™), glycol ethers, mineral spirits, methyl carbitol, butyl carbitol, phthalates, adipates, and the like.

Suitable mildewcides and biocides include zinc oxide, isothiazolones, triazoles, and the like.

Suitable surfactants include cationic, anionic, and non-ionic surfactants.

Suitable aggregates include small (typically 40 mesh and higher), intermediate (typically 20-40 mesh) and large (typically 20 mesh and lower) fillers, such as sand, large particle size carbonates (limestone), ceramics, glass, fibers, coal, granite, talc, multicolored quartz, crushed sea shells, recycled products such as asphalt-containing materials, fiberglass, vermiculite, perlite, XO aggregate and the like.

Suitable flash rust inhibitors include aminoethylethanol amine, ammonium benzoate, sodium nitrite, ammonia benzoate, ammonium and amine salts of dicarboxylic acids and diphenols, such as glutaric acid, malonic acid, suberic acid, sebacic acid, adipic acid, succinic acid, phthalic acid, isophthalic acid, terephthalic acid, thidiphenol and sulfonyldiphenol and their ammonium and amine-complexed zinc salts, C-12 to C-14-tert-alkylamines, compounds with (2-benzothiazolythio)-butanedioic acid; (2-benzothiazolyltio) butanedioic acid, 4-oxo-4-p-tolylbutryic acid adduct with 4-ethylmorpholine, zirconium complex with 4-methyl-δ-oxo-benzene-butanoic acid and the like.

Suitable crosslinking agents include multivalent metal ions, such as zinc, magnesium, zirconium, calcium and like ions.

Reactive pigments are materials that are added to coating formulations to minimize the corrosion of metal substrates. Suitable reactive pigments include calcium zinc phosphomolydate, zinc phosphate, aluminum triphosphate, strontium zinc phosphosilicate, molybdate-modified zinc phosphate and the like.

Suitable waxes include carnauba, paraffin, polyethylene, micronized ethylene-acrylic acid, polytetrafluoroethylene (PTFE), and the like.

In another preferred embodiment, the prepaints and methods of the present invention are used to make elastomeric coatings suitable for either wall or roof applications. These prepaints are mixed in various ratios to obtain elastomeric coatings of different quality, flexibility, mildew protection, and substrate adhesion suitable for either application on wall or roofs.

The main feature that distinguishes elastomeric coatings from typical architectural coatings is the use of binders with low temperature (<0° C.) flexibility and the thickness at which the coating is applied (typically a dry coating thickness of about 6 to about 20 mil for wall applications and about 15 to about 40 mil for roof applications). Low temperature flexibility is particularly desirable for elastomeric coatings when they are being used over walls that may develop cracks, such as masonry walls, or roofing substrates that have a high degree of dimensional variance with climate. In addition to coating flexibility, it is desirable to have an elastomeric coating line with different degrees of low temperature flexibility, different qualities, ability to adhere to different substrates, and variations in appearance. In certain embodiments, the elastomeric coating is further varied through the addition of colorants. These colorants are dry ground and added to the coating grind portion, or alternatively they are post-added.

For elastomeric coatings, the following properties may be varied in the coating manufacture to make different elastomeric coatings: coating flexibility, coating quality (durability), substrate adhesion and appearance. Adjustment of one or more of the properties of binder Tg, coating PVC, and the presence and level of zinc oxide in the coating is a basis for differentiating elastomeric coatings based on the flexibility of the coating. Adjustment of the level of titanium dioxide ($TiO_2$) is a basis for differentiating elastomeric coatings based on the durability of the coating. Adjustment of the binder composition and level is a basis for differentiating elastomeric coatings based on the adhesion of the coating to a substrate. Adjustment of the level and type of colorant is a basis for differentiating elastomeric coatings based on the appearance of the coating.

In another preferred embodiment, the prepaints and methods for the manufacture thereof disclosed herein are used to make non-cementitious, aggregate finish coatings suitable for application on a wall directly or as a topcoat in exterior insulation and finishing systems (EIFS). These prepaints or preformulated components are mixed in various ratios to obtain coatings of different flexibility, quality (durability), color, and texture.

As a specific embodiment of this invention relating to non-cementitious, aggregate finish coatings, one or more of the following properties are varied in the coating manufacture to make different coatings: PVC level, $TiO_2$ level, aggregate ratio and binder $T_g$. Adjustment of the binder Tg is a basis for differentiating non-cementitious, aggregate finish coatings based on the flexibility of the coating. Adjustment of the PVC of the coating is a basis for differentiating non-cementitious, aggregate finish coatings based on the durability of the coating. Adjustment of the level of TiO2 and the type and level of colorant is a basis for differentiating elastomeric coatings based on the color of the coating to a substrate. Adjustment of the size and level of the large aggregate, and the ratio of the large aggregate to small aggregate of colorant is a basis for differentiating non-cementitious, aggregate finish coatings based on the texture of the coating.

In another preferred embodiment, the prepaints and methods of the present invention are used to make road-marking coatings. As used herein, the term "road" generically includes any indoor or outdoor solid surface which is or may be exposed to pedestrians, moving vehicles, tractors, or aircraft, either constantly or intermittently.

Quick-setting or nonquick-setting binders are used to make the road marking coatings. As used herein, the term "quick-setting," means a coating that has a drying time of no greater than about 10 minutes as measured by a modified ASTM D1640 dry time test. ASTM D1640 is a standard test for drying of organic coatings at room temperature in which the test films are applied on a non-porous substrate (e.g., a glass plate or metal panel) by a suitable means to give a wet film thickness of 0.012+/−0.001 inches. The ASTM test method is modified in that only minimal thumb pressure is applied. The thumb is turned through an angle of 90° while in contact with the test film. The drying time at which this rotation does not break the film is recorded. A number of quick-setting binder systems are known in the art.

The binders used to make the road marking coating have the ability to achieve quick-setting times between the slowest setting time achievable using a non-quick-setting binder, and the fastest setting time achievable using a quick-setting binder. For example, it may be desirable to include binders which are quicker setting when the paints are applied on a humid or rainy day, but not desirable from a cost perspective when the paints are applied on a dry day. It is within the scope of the present invention to utilize both types of binders in the system by performing at least one of the steps of:

(1) separating the component(s)/ingredient(s) that cause the quick-setting ("quick-setting component") from the binder as a separate prepaint;

(2) employing a quick-setting binder in the binder prepaints; and (3) adding the quick-setting component separately from any of the prepaints.

Other road marking coating additives include glass beads, and absorber particles. In one embodiment, at least one of the prepaints used to make the road marking coating contains absorbers that accelerate the drying of the road-marking paint. The absorbers are added to the prepaint during, prior to, or after application of the road marking coating to the road surface. Suitable absorbers include organic superabsorbent polymers, ion-exchange resins, hollow sphere polymers, molecular sieves, talcs, inorganic absorbers such as inorganic superabsorbent gels and silica gel, porous and non-porous carbonaceous materials, encapsulated, alkali-swellable polymers, and mixtures thereof.

In a further preferred embodiment, the prepaints are used in the methods of the invention to form a range of coatings which are applied over a variety of substrates, including metal, wood, and cementitious substrates, such as concrete roof tiles.

In yet another preferred embodiment, the prepaints are used in the methods disclosed herein to form a range of graphic arts paint lines useful as inks for a number of applications including, but not limited to: giftwrap paper, corrugated substrate, newsprint, paperboard, labels, freezer bags, storage bags, metal films, and foils; as well as overprint coatings applied for purposes of providing properties such as water-resistance, rub-resistance and high slip.

The methods of the present invention are capable of being carried out at a paint manufacturing facility, a point-of-sale or a point-of-use. The methods are capable of being controlled by a computer. The methods are not limited in scope to the preparation of latex paints but are also applicable to the preparation of any water-borne coatings, solvent-borne coatings, and related building products, including, sealants, caulks, mastics, adhesives and other related products, requiring the mixing of component ingredients.

The following examples are presented to illustrate the invention.

EXAMPLE 1

This example describes the preparation of an opacifying pigment prepaint which is prepared by combining the following ingredients:

| Ingredient | Amount (g) |
| --- | --- |
| Pigment - Titanium Dioxide Slurry (76.5% solids) (Ti-Pure ™ R-746 - DuPont) | 5226 |
| Dispersant (Tamol ™ 1124 - Rohm and Haas) | 32 |
| Defoamer (Drewplus ™ L-475) | 5 |
| Rheology Modifier (Acrysol ™ RM-8W - Rohm and Haas) | 59 |
| Base - Ammonia (28%) | 8 |
| Water | 1588 |

The prepaint is prepared using a laboratory mixer having a 45° pitch stirring blade. The water, dispersant, and defoamer, are combined and mixed. The titanium dioxide slurry is slowly added and the mixture is stirred for 15–20 minutes. The rheology modifier and ammonia are then added. The prepaint is spray dried to produce a solid opacifying pigment prepaint.

EXAMPLE 2

This example describes the preparation of an exterior extender pigment prepaint. It is prepared by combining the following ingredients:

| Ingredient | Amount (g) |
| --- | --- |
| Pigment - Nepheline Syenite (7.5 µ) (Minex ™ 4) | 3556 |
| Dispersant (Tamol ™ 1124 - Rohm and Haas) | 36 |
| Defoamer (Drewplus ™ L-475) | 9 |
| Rheology Modifier (Acrysol ™ RM-8W - Rohm and Haas) | 12 |
| Water | 1674 |

The prepaint is prepared using a laboratory mixer having a 45° pitch stirring blade. The water, dispersant, and defoamer, are combined and mixed. The Nepheline Syenite is slowly added, and the mixture is stirred for 15–20 minutes. The rheology modifier is then added. The prepaint is spray dried to produce a solid extender pigment prepaint.

EXAMPLE 3

This example describes the preparation of a vinyl acetate/acrylic latex polymer binder prepaint. The binder prepaint is prepared using a laboratory mixer having a 45° pitch stirring blade. The water, defoamer, binder and rheology modifier, coalescent and ammonia are combined and mixed. The ingredients and amounts are as follows:

| Ingredient | Amount (g) |
| --- | --- |
| Defoamer (Drewplus ™ L-475) | 36 |
| Binder - Vinyl Acetate/Acrylic (55% solids - Tg 14° C.) (RES ™ 3803- Rohm and Haas) | 3574 |
| Coalescent (Texanol ™) | 136 |
| Rheology Modifier -HEUR (Acrysol ™ SCT-275 - Rohm and Haas) | 14 |
| Base - Ammonia (28%) | 9 |
| Water | 272 |

The prepaint is spray dried with calcium carbonate to produce a solid polymer binder prepaint.

EXAMPLE 4

This example describes a gloss acrylic binder prepaint. The binder prepaint is prepared using a laboratory mixer having a 45° pitch stirring blade. The water, defoamer, binder and rheology modifier, coalescent, propylene glycol and ammonia are combined and mixed. The ingredients and amounts are as follows:

| Ingredient | Amount (g) |
| --- | --- |
| Defoamer (Drewplus ™ L-475) | 36 |
| Binder - Acrylic (50% solids - Tg 28° C.) (Rhoplex ™ SG-10M - Rohm and Haas) | 3343 |
| Coalescent (Texanol ™) | 168 |
| Rheology Modifier - HEUR (Acrysol ™ RM 8W - Rohm and Haas) | 54 |
| Base - Ammonia (28%) | 2 |
| Solvent - Propylene Glycol | 272 |
| Water | 95 |

The prepaint is spray dried with calcium carbonate to create a solid polymer binder prepaint.

EXAMPLE 5

This example describes the preparation of a flat acrylic binder prepaint. The binder prepaint is prepared using a laboratory mixer having a 45° pitch stirring blade. The water, defoamer, binder and rheology modifier, coalescent, propylene glycol and ammonia are combined and mixed. The ingredients and amounts are as follows:

| Ingredient | Amount (g) |
| --- | --- |
| Defoamer (Drewplus ™ L-475) | 36 |
| Binder - Acrylic (53.5% solids - Tg 18° C.) (Rhoplex ™ ML-200 - Rohm and Haas) | 3493 |
| Coalescent (Texanol ™) | 132 |
| Rheology Modifier (HEUR) (Acrysol ™ RM-8W - Rohm and Haas) | 5 |
| Base - Ammonia (28%) | 3 |
| Solvent - Propylene Glycol | 272 |
| Water | 59 |

The prepaint is spray dried with calcium carbonate to create a solid polymer binder prepaint.

EXAMPLE 6

This example describes the preparation of an interior extender pigment prepaint. It is prepared by combining the following ingredients:

| Ingredient | Amount (g) |
| --- | --- |
| Pigment - Calcium Carbonate (12 µ) (Omyacarb ™ 12) | 1837 |
| Pigment - Calcium Carbonate (3.2 µ) (Vicron ™ 15-15) | 930 |
| Pigment - Aluminum Silicate (1.4 µ) (Optiwhite ™) | 748 |
| Dispersant (Tamol ™ 1124 -Rohm and Haas) | 36 |
| Defoamer (Drewplus ™ L-475) | 5 |
| Rheology Modifier - HEUR (Acrysol ™ RM-2020-NPR) | 82 |
| Base - Ammonia (28%) | 5 |
| Water | 1615 |

The prepaint is prepared using a laboratory mixer having a 45° pitch stirring blade. The water, dispersant, and defoamer, are combined and mixed. The calcium carbonate and aluminum silicate pigments are slowly added, and the mixture is stirred for 15–20 minutes. The ammonia and rheology modifier are then added. The prepaint is spray dried to create a solid extender pigment prepaint.

EXAMPLE 7

This example describes the preparation of paints using the prepaints of Examples 1 to 6. The paints are prepared by mixing the opacifying pigment prepaint and the extender pigment prepaint with the binder prepaint, and then adding the water, thickeners, and colorants and mixing well. The Stormer viscosity, ICI viscosity, and pH are the equilibrated measured values.

Part A—Exterior Flat Paints

| | Prepaint (g) | | | | Thickener (g) | | | |
| --- | --- | --- | --- | --- | --- | --- | --- | --- |
| | | Exterior | | Flat | | | | |
| Paint No. | Opacifying Pigment (Ex 1) | Extender Pigment (Ex 2) | PVA Binder (Ex 3) | Acrylic Binder (Ex 4) | Acrysol SCT-275 | Acrysol RM 2020 NPR | Water (g) | Colorant (g) |
| 35-1 | 1184 | 803 | — | 1696 | 45 | 64 | 1302 | — |
| 35-2 | 789 | 1016 | 989 | 272 | 118 | 50 | 1728 | — |
| 35-3 | — | 1492 | — | 1615 | 145 | — | 1275 | 735 |
| 35-4 | — | 1447 | 1098 | 295 | 218 | — | 1719 | 735 |

Part B—Exterior Satin Paint

| | Prepaint (g) | | | | Thickener (g) | | | |
| --- | --- | --- | --- | --- | --- | --- | --- | --- |
| | | Exterior | | Flat | | | | |
| Paint No. | Opacifying Pigment (Ex 1) | Extender Pigment (Ex 2) | PVA Binder (Ex 3) | Acrylic Binder (Ex 4) | Acrysol SCT-275 | Acrysol RM 2020 NPR | Water (g) | Colorant (g) |
| 35-5 | 1057 | 395 | — | 1665 | 82 | 77 | 1501 | — |

Part C—Exterior Semigloss

| Paint No. | Prepaint (g) Opacifying Pigment (Ex 1) | Exterior Extender Pigment (Ex 2) | PVA Binder (Ex 3) | Gloss Acrylic Binder (Ex 5) | Thickener (g) Acrysol SCT-275 | Acrysol RM 2020 NPR | Water (g) | Colorant (g) |
|---|---|---|---|---|---|---|---|---|
| 35-6 | 1302 | — | — | 2549 | — | 68 | 785 | — |
| 35-7 | 1288 | — | 399 | 1456 | 100 | 118 | 1338 | — |

Part D—Interior Flat

| Paint No. | Prepaint (g) Opacifying Pigment (Ex 1) | Interior Extender Pigment (Ex 6) | PVA Binder (Ex 3) | Flat Acrylic Binder (Ex 5) | Thickener (g) Acrysol SCT-275 | Acrysol RM 2020 NPR | Water (g) | Colorant (g) |
|---|---|---|---|---|---|---|---|---|
| 35-8 | 1057 | 821 | 984 | 268 | 109 | 95 | 1665 | — |
| 35-9 | 390 | 1724 | 513 | — | 159 | — | 2286 | — |
| 35-10 | — | 1447 | 1102 | 304 | 191 | — | 1692 | 735 |
| 35-11 | — | 1878 | 631 | — | 231 | — | 2191 | 735 |

Part E—Interior Satin Paint

| Paint No. | Prepaint (g) Opacifying Pigment (Ex 1) | Interior Extender Pigment (Ex 6) | PVA Binder (Ex 3) | Flat Acrylic Binder (Ex 5) | Thickener (g) Acrysol SCT-275 | Acrysol RM 2020 NPR | Water (g) | Colorant (g) |
|---|---|---|---|---|---|---|---|---|
| 35-12 | 1057 | 404 | 1560 | — | 113 | 95 | 1551 | — |

Part F—Semi-Gloss Paint

| Paint No. | Prepaint (g) Opacifying Pigment (Ex 1) | Interior Extender Pigment (Ex 6) | PVA Binder (Ex 3) | Gloss Acrylic Binder (Ex 4) | Thickener (g) Acrysol SCT-275 | Acrysol RM 2020 NPR | Water (g) | Colorant (g) |
|---|---|---|---|---|---|---|---|---|
| 35-13 | 1288 | — | 1374 | 417 | 100 | 118 | 1397 | — |
| 35-14 | 1207 | — | 1624 | — | 132 | 127 | 1560 | — |

What is claimed is:

1. A method of forming at least one paint line, comprising:
   a. providing a set of mutually compatible, water dispersible prepaints, comprising:
      i. at least one prepaint x, comprising at least one opacifying pigment;
      ii. at least one prepaint y, comprising at least one extender pigment; and
      iii. at least one prepaint z, comprising at least one polymer binder; wherein at least one of said prepaints (i), (ii), and (iii) is a solid; and b. dispensing predetermined amounts of said prepaints into containers or application devices to form at least one paint lines,
wherein said method further includes the step of mixing an associative thickener with at feast one of said prepaints.

2. The method of claim 1, wherein said at least one paint line is useful for at least one application selected from the group consisting of road marking coatings, architectural coatings, industrial coatings, graphic art coatings, non-cementitious aggregate finish coatings, elastomeric coatings, adhesives, and caulks.

3. A method of forming a coating on a substrate, comprising the steps of:
   a. providing a set of mutually compatible, water dispersible prepaints, comprising:
      i. at least one prepaint x, comprising at least one opacifying pigment;
      ii. at least one prepaint y, comprising at least one extender pigment; and
      iii. at least one prepaint z, comprising at least one polymer binder;
   wherein said prepaints (i), (ii), and (iii) are solid;
   b. dispensing predetermined amounts of said solid prepaints into containers or application devices to form at least one paint line;
   c. dispersing said solid prepaints in an aqueous medium, to form a dispersion;
   d. applying said dispersion to a substrate; and
   e. drying said dispersion to form a coating,
   wherein said method further includes the step of mixing an associative thickener with at least one of said prepaints.

4. A method of forming a range of paints comprising at least two paint lines, said method comprising the steps of:
   a. providing a set of mutually compatible, water dispersible, prepaints sufficient to formulate at least two paint lines, comprising:
      i. at least one prepaint x, comprising at least one opacifying pigment;
      ii. at least one prepaint y, comprising at least one extender pigment;
      iii. at least one prepaint z, comprising at least one polymer binder, and
      iv. at least one additional, opacifying, extender, or polymer binder prepaint which is different from prepaints x, y, and z;
      wherein at least one of said prepaints (i), (ii), (iii) and (iv) is a solid; and
   b. dispensing a predetermined amount of each of the prepaints into containers or application devices to form a range of paints,
   wherein said method further includes the step of mixing an associative thickener with at least one of said prepaints.

5. The method of claim 4, wherein said range of paints is useful for at least one application selected from the group consisting of road marking coatings, architectural coatings, industrial coatings, graphic art coatings, non-cementitious aggregate finish coatings, elastomeric coatings, adhesives, and caulks.

6. The method of claim 1, wherein said method is controlled by a computer.

7. The method of claim 4, wherein said method is controlled by a computer.

8. The method, according to claim 1, 3, or 4, wherein said extender pigment prepaint is in the form of a liquid having a pigment volume concentration of from about 40 to 100%, and a volume solids of from about 40 to about 70%.

* * * * *